April 30, 1963
A. ORLICK ETAL
3,087,259
EDUCATIONAL TOY DEVICE FOR TEACHING ALPHABETS OR THE LIKE BY SOUND
Filed May 18, 1961
3 Sheets-Sheet 1
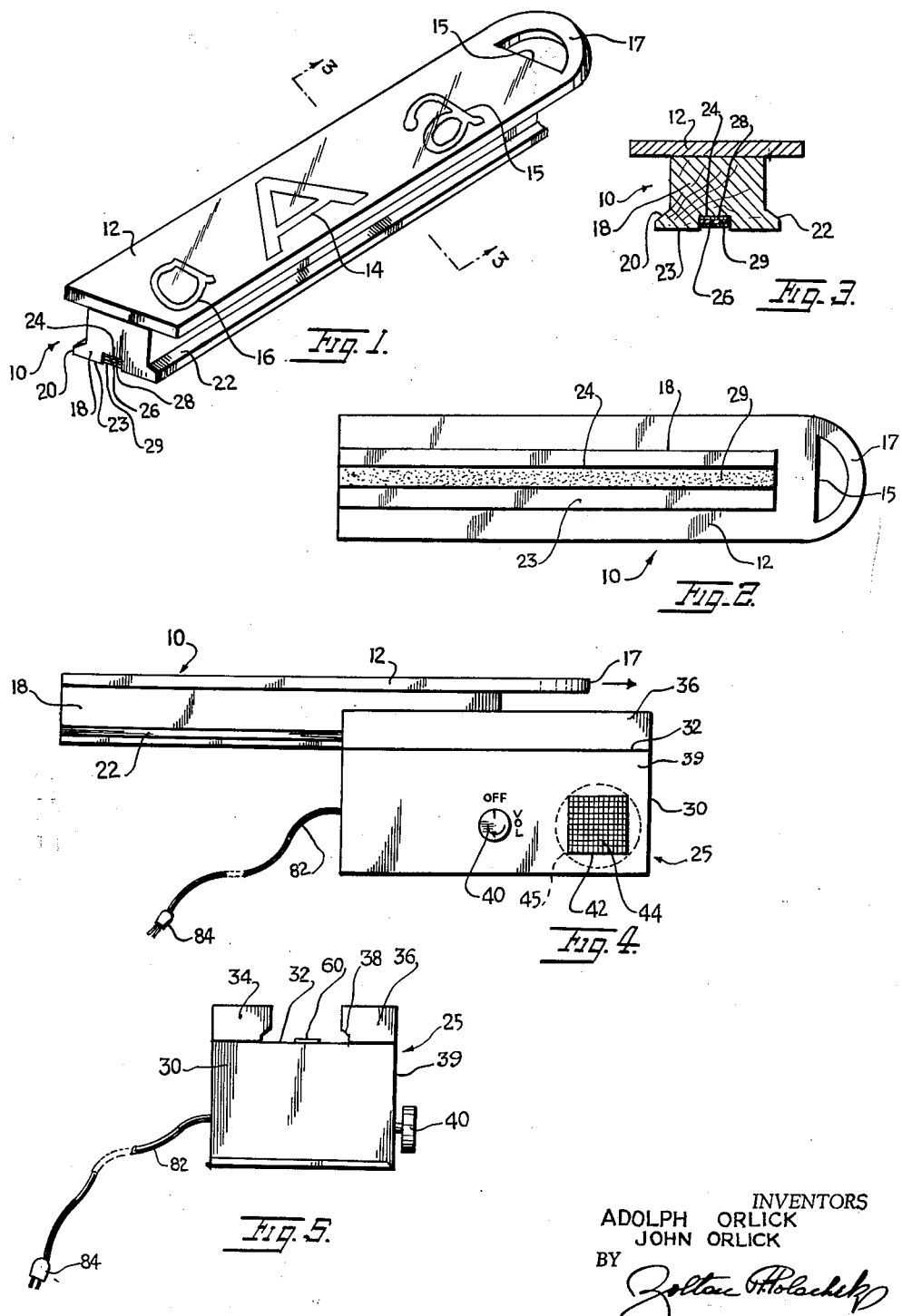
INVENTORS
ADOLPH ORLICK
JOHN ORLICK
BY
*Zoltan Holachek*
ATTORNEY

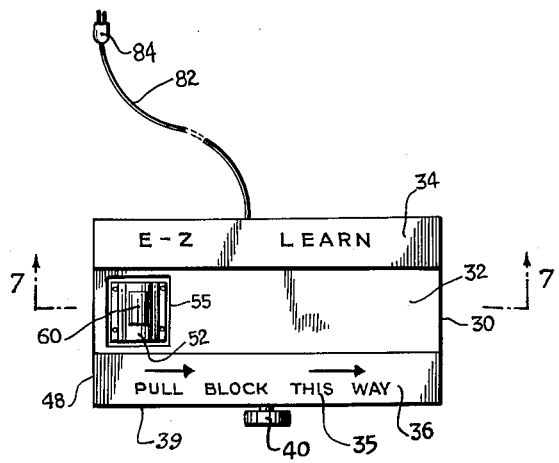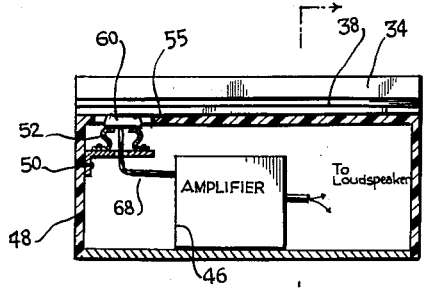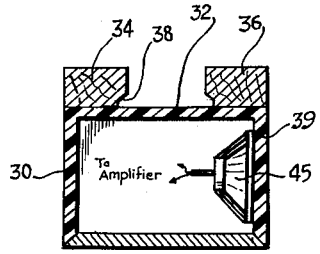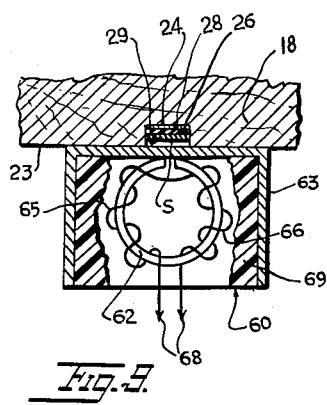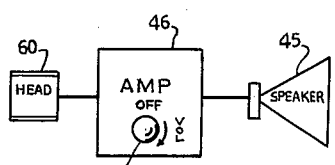

April 30, 1963　　A. ORLICK ETAL　　3,087,259
EDUCATIONAL TOY DEVICE FOR TEACHING
ALPHABETS OR THE LIKE BY SOUND
Filed May 18, 1961　　3 Sheets-Sheet 3
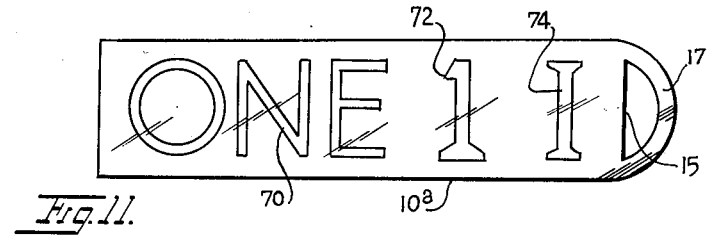
Fig. 11.
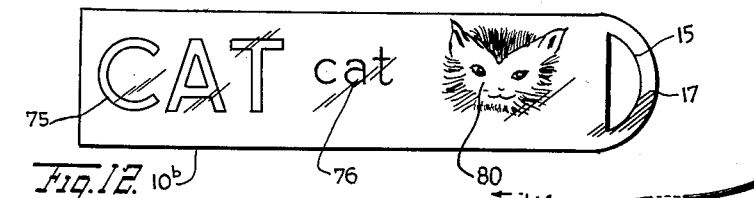
Fig. 12.
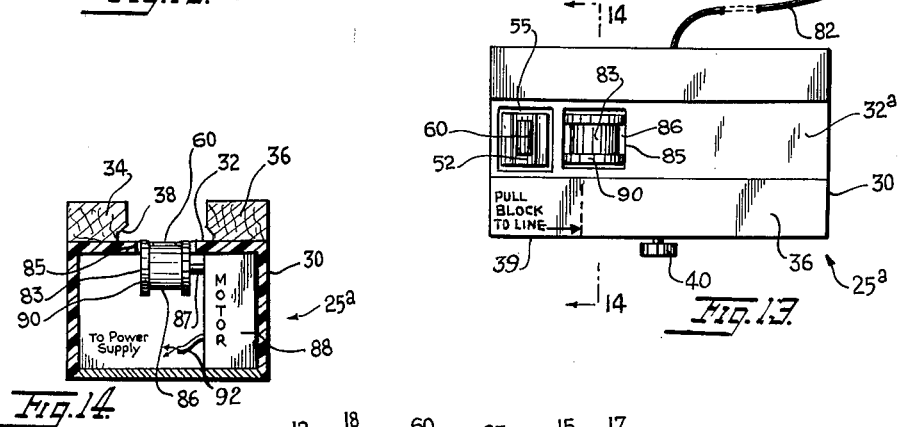
Fig. 13.
Fig. 14.
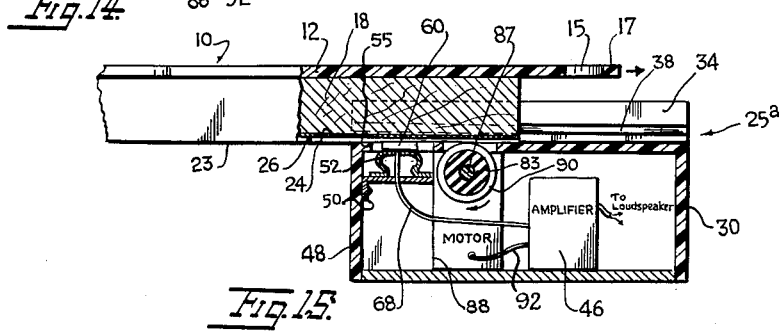
Fig. 15.
INVENTORS
ADOLPH ORLICK
JOHN ORLICK
BY
ATTORNEY ns Patent Office
3,087,259
Patented Apr. 30, 1963

3,087,259
EDUCATIONAL TOY DEVICE FOR TEACHING ALPHABETS OR THE LIKE BY SOUND
Adolph Orlick, 115—57 231st St., Cambridge Heights, N.Y., and John Orlick, 249—29 144th Ave., Rosedale, N.Y.
Filed May 18, 1961, Ser. No. 111,893
1 Claim. (Cl. 35—35)

This invention concerns a device especially adapted for teaching alphabets, numerals, and simple words to young children.

According to the invention a plurality of blocks, strips or cards are provided on each of which is recorded the sound of a single letter, numeral or simple word, preferably one of one syllable. The record is impressed in a magnetic coating of a strip embedded in the block. On the top of the block is printed the letter, numeral or word which is reproduced when the block is pulled through a suitable recording device. The recording device has a channel adapted to receive a record block. A suitable magnetic pickup head is disposed in the path of movement of the block when it is drawn along the channel. The head picks up the recorded letter, numeral or word and applies it as signal pulses to an amplifier. A loudspeaker is connected to the amplifier to reproduce audibly the recorded letter, numeral or word. The invention is adapted to teach a young child or adult student in his native language or in a foreign language. On the record block there may be recorded the same word in different languages so that a student can hear the correct pronunciation of the word in several languages in a single pass of the record block through the reproducer.

It is therefore one object of the invention to provide a record block adapted to be pulled through a sound reproducing device for audibly reproducing a letter, word or numeral recorded on a recording medium carried by the block.

A further object is to provide a sound reproducing device adapted to reproduce audibly letters, words or numerals recorded on record blocks, the device having a channel for slidably receiving the blocks, and magnetic pickup means for picking up the recorded subject matter from the blocks.

Another object is to provide a sound reproducing device of the character described, having motor driven means for advancing a record block therethrough.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a perspective view of a record block according to the invention.

FIG. 2 is a bottom plan view on a reduced scale of the record block.

FIG. 3 is a sectional view taken on line 3—3 of FIG. 1.

FIG. 4 is a side elevational view on a reduced scale of a reproducer device and record block according to the invention.

FIG. 5 is an end view of the reproducer device per se.

FIG. 6 is a top plan view of the reproducer device.

FIG. 7 is a sectional view taken on line 7—7 of FIG. 6.

FIG. 8 is a sectional view taken on line 8—8 of FIG. 7.

FIG. 9 is a sectional view on an enlarged scale, partially diagrammatic in form, of a magnetic sound pickup head with part of a record block shown thereon.

FIG. 10 is a diagram of electrical components of the device.

FIGS. 11 and 12 are top plan views on a reduced scale of two different record blocks according to the invention.

FIG. 13 is a top plan view of another reproducer device according to the invention.

FIG. 14 is a sectional view taken on line 14—14 of FIG. 13.

FIG. 15 is a vertical sectional view through reproducer device of FIG. 13 with a record block mounted thereon.

Referring to FIGS. 1–3, there is shown a record block 10 which includes an elongated rectangular top plate 12 preferably formed of plastic material. On the plate is printed or otherwise marked a letter such as the letter "A" in upper case, lower case and script as shown at 14, 15 and 16, respectively. The plate has a depending elongated pedestal 18 which may also be made of plastic, or it may be made of wood or other material secured by cement or the like to the plate 12. The pedestal has lateral ridges 20, 22 formed at the bottom 23. At the flat bottom 23 of the pedestal is a longitudinal groove 24 in which is set a strip of plastic tape 26. The tape may be secured by an adhesive layer 28. The outer side of the tape is coated with a magnetic material 29 on which is recorded once, or a plurality of times, the sound of letter "A" in English and/or in any foreign language corresponding to indicia 14–16. The plate 12 has an aperture 15 formed in its distal end defining a handle 17 adapted to be grasped by the user for pulling the record block through a suitable reproducer device 25.

The reproducer device 25 is shown to best advantage in FIGS. 4–8. The device includes a rectangular casing 30. On the top 32 of the casing is a pair of spaced rails or bars 34, 36 extending longitudinally of the top and parallel to each other. At the base of each rail is a groove 38. The rails define a dovetail channel which will slidably receive the ridges or dovetailed pedestal 18 of the block 10. On the rails 34, 36 is inscribed indicia 35 instructing the student in use of the device. At the front side 39 of the casing is a power On-Off switch and volume control knob 40. Adjacent knob 40 is a rectangular opening 42 in side 39. At this opening is a grille 44 and behind the grille is a loud-speaker 45. An amplifier 46 has its output connected to the loud-speaker 45 as indicated in FIGS. 7, 8 and 10.

On end wall 48 of the casing is a bracket 50. A leaf spring 52 is attached to the bracket and on this spring is mounted a magnetic pickup head 60. The top of the head is exposed in a slot or hole 55 formed in top 32 of the casing. The top of the head 60 projects very slightly above the top 32 so that the head may contact the underside of the pedestal 18. It will be noted that the tape 26 is recessed slightly within the groove 24 so that when the pedestal rides over the spring biased head, the coating 29 will be spaced a small but predetermined distance from the magnetic core 62, shown in FIG. 9. The head has a thin, nonmagnetic metal cover 63, over which the block 10 rides when drawn by handle 16. The core 62 is then spaced only a few thousandths of an inch from the cover 63 and magnetic layer 29 as indicated at S in FIG. 9. In FIG. 9 the core 62 is shown provided with windings 65, 66 which terminate in leads 68 connected to the input of amplifier 46. The core is embedded in a plastic block 69.

In operation of the device, the student inserts a record block into the device 25 between rails 34, 36 as indicated in FIG. 4 and draws the block over the casing top 32 by grasping handle 17. As the block is drawn over head 60, the loudspeaker reproduces audibly one or a number of times the name of the letter, numeral or word marked on the block.

In FIG. 11, the numeral "one" is inscribed in letters 70 and in Arabic and Roman numerals 72 and 74 on block 10ª. In FIG. 12, the word "cat" is inscribed in upper case and lower case letters 75, 76 on block 10ᵇ. Also a picture 80 of a cat is drawn on the top of the block. The sound record under blocks 10ª and 10ᵇ corresponds to the subject matter inscribed on top of the block. Thus a student, even a young child of pre-school age, can be instructed in elementary numerals and letters without aid of a teacher.

The reproducer may have a local battery power supply or it may be energized from a suitable source of power by a cable 82 connected to the amplifier and provided with a plug 84 for insertion into a suitable receptacle. The amplifier may employ transistors or electronic tubes for amplification.

In FIGS. 13-15 is shown another reproducer device 25ª in which parts corresponding to those of device 25 are identically numbered. The device 25ª has a rectangular opening 85 in the top 32ª located just beyond opening 55. A rubber roller 83 is rotatably mounted in opening 85. The roller is formed with a central peripheral groove 86. The roller rotates on a shaft 87 driven by a motor 88. The roller has two spaced ridges 90 which extend upwardly through opening 85. These ridges engage the bottom of block 10 on opposite sides of groove 24 to advance the block between rails 34, 36. The motor is energized via wire 92 supplied with power via cable 82 to which wire 92 is connected.

In operation of the device 25ª, the student draws a block 10 over the casing top between the rails until the bottom 23 of the block is engaged by the ridges 90 of roller 83 and the block is advanced at a predetermined speed over the head 60 while the recorded subject matter on tape 26 is reproduced by the amplifier and loudspeaker.

The device 25ª thus provides a means for moving the block 10 through the device automatically at a fixed speed so that reproduction of the recorded subject matter is clear and undistorted.

The blocks 10, 10ª and 10ᵇ, and others of similar type, may be used in either reproducing devices 25 or 25ª.

While we have illustrated and described the preferred embodiments of our invention, it is to be understood that we do not limit ourselves to the precise constructions herein disclosed and that various changes and modifications may be made within the scope of the invention as defined in the appended claims.

Having thus described our invention, what we claim as new, and desire to secure by United States Letters Patent is:

An educational device for audibly reproducing recorded teaching material, comprising a block having a top plate with a handle portion at one end, a pedestal depending from the underside of the plate, said pedestal having a flat bottom, dovetail ridges extending outwardly of opposite edges of said flat bottom, said flat bottom having a central groove extending longitudinally thereof, indicia inscribed on the top plate, a magnetic record strip embedded in said groove and carrying recorded signals corresponding to said indicia, said strip being spaced slightly from the plane of said flat bottom; a casing having a pair of rails on top thereof, said rails having dovetail grooves receiving the dovetail ridges respectively to guide the block over the top of the casing, said top having a first aperture therein, a magnetic head, spring means in the casing supporting said head in said aperture and pressing said head into contact with said flat bottom of the block, said record strip being disposed adjacent to said head so that the head picks up the recorded signals from the record strip, an amplifier and loud-speaker in the casing connected in circuit with said head to reproduce audibly signals picked up by said head, whereby the block may be grasped by said handle portion and manually pulled over the casing while the rails guide movement of the block for audible reproduction of the signals recorded on said strip, said top having another aperture adjacent to the first aperture, a flexible roller rotatably mounted in the other aperture and engaging the bottom of the block, and a motor in the casing rotatably supporting the roller on an axis parallel to the top of the casing and the bottom of the block, whereby said roller draws the block over the top of the casing at a predetermined speed when driven by the motor while said head picks up the signals recorded on said strip and the loudspeaker audibly reproduces the picked up signals.

References Cited in the file of this patent

UNITED STATES PATENTS

| | | |
|---|---|---|
| 2,603,006 | MacChesney et al. | July 15, 1952 |
| 2,677,200 | MacChesney | May 4, 1954 |
| 2,822,425 | Hicks | Feb. 4, 1958 |
| 2,962,558 | Hoshino | Nov. 29, 1960 |